United States Patent [19]
Caridis et al.

[11] 3,947,241
[45] Mar. 30, 1976

[54] FOOD TREATMENT APPARATUS AND PROCESS

[75] Inventors: Andrew A. Caridis, Foster City; Clark K. Benson, Millbrae, both of Calif.

[73] Assignee: Heat and Control, Inc., San Francisco, Calif.

[22] Filed: Jan. 27, 1975

[21] Appl. No.: 544,393

Related U.S. Application Data

[63] Continuation of Ser. No. 328,925, Feb. 2, 1973, abandoned.

[52] U.S. Cl. ............... 432/121; 432/148; 432/152; 432/176
[51] Int. Cl.² ..................... F27B 9/00; F27B 9/14
[58] Field of Search .......... 432/121, 144, 148, 152, 432/176, 198

[56] References Cited
UNITED STATES PATENTS

| | | | |
|---|---|---|---|
| 2,235,476 | 3/1941 | Cook | 431/121 |
| 2,345,721 | 4/1944 | Allstatter | 432/152 |
| 3,459,413 | 8/1969 | Bracken et al. | 432/238 |
| 3,513,293 | 5/1970 | Beck | 432/152 |
| 3,614,074 | 10/1971 | Wellford, Jr. | 432/176 |

*Primary Examiner*—John J. Camby
*Attorney, Agent, or Firm*—Flehr, Hohbach, Test, Albritton and Herbert

[57] ABSTRACT

An oven for treatment of solid foods includes an elongated, double-walled housing divided into a cooking chamber and a heating chamber containing heating means. Fan means in the heating chamber create a draft into which water vapor is introduced and the draft is circulated through both chambers. The product is carried on a vapor pervious conveyor through the cooking chamber.

The cooking process comprises the steps of providing a food treatment chamber equipped with a vapor pervious conveyor; preparing a moving stream of a process vapor at a temperature above 212°F.; circulating the stream along the conveyor; injecting water vapor into the moving stream of process vapor and supplying heat to the moving stream; placing the food product in discrete pieces upon the conveyor; and moving the product continuously in its original position on the conveyor through the treatment chamber.

11 Claims, 12 Drawing Figures

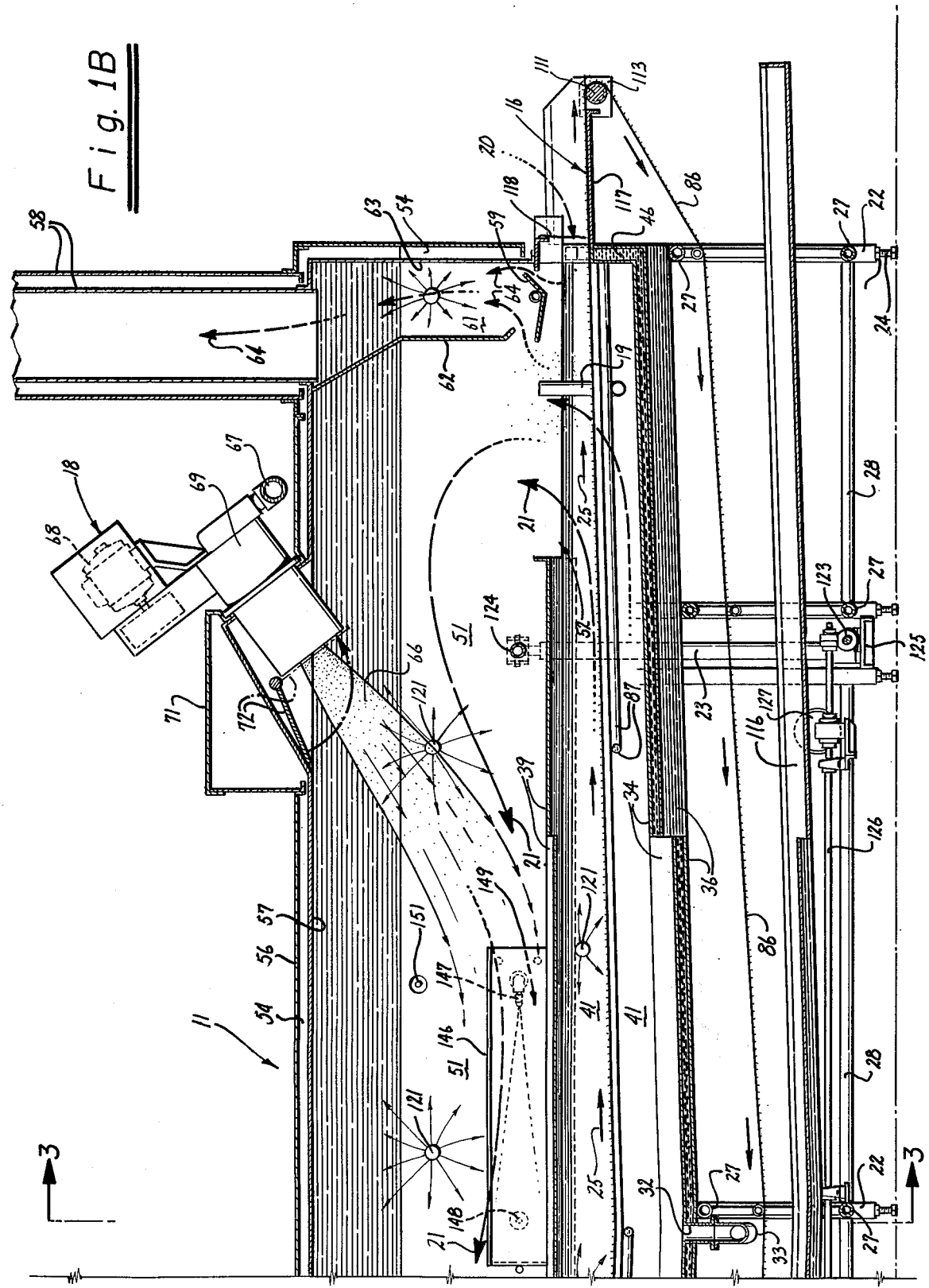

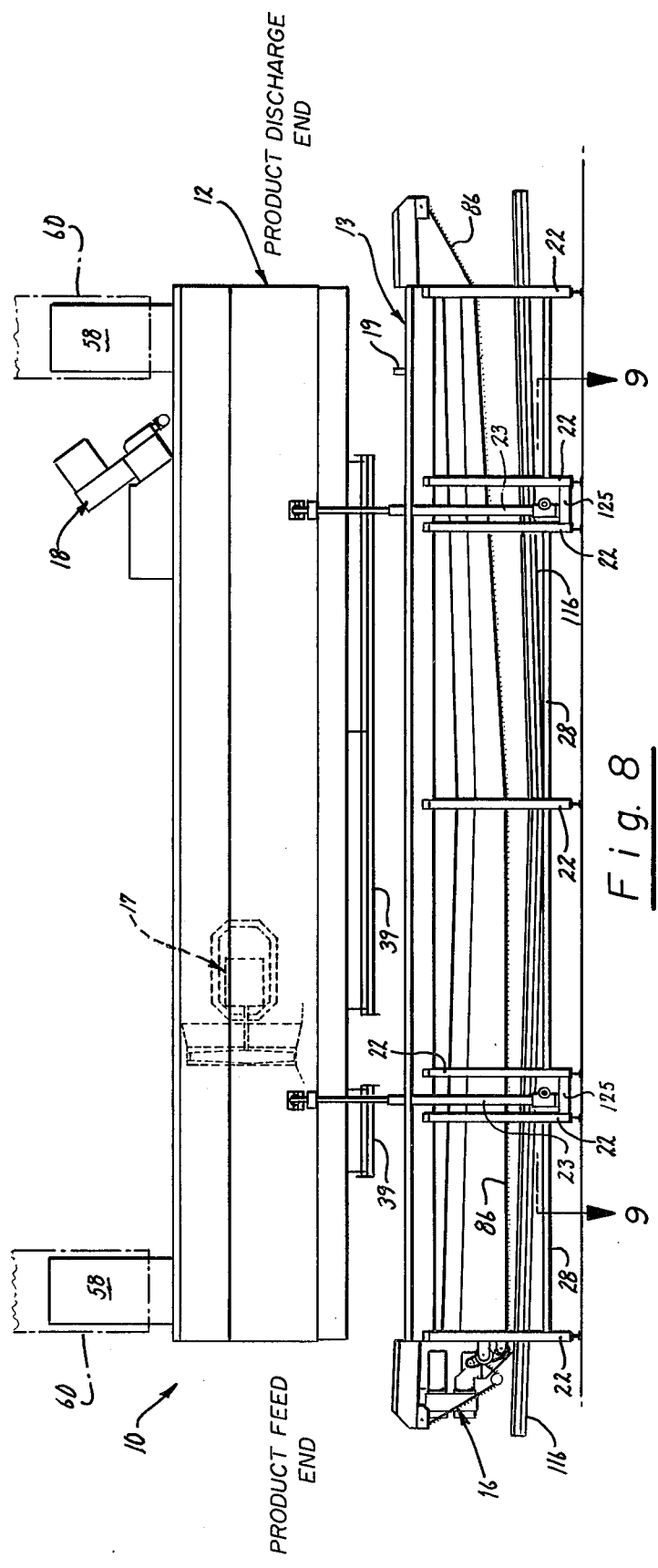
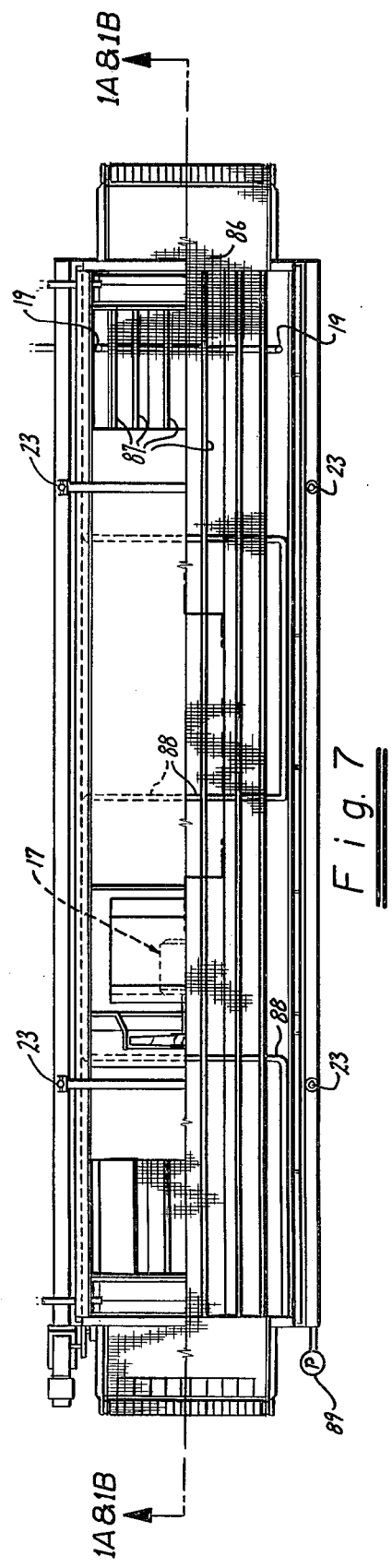
Fig. 8
Fig. 7

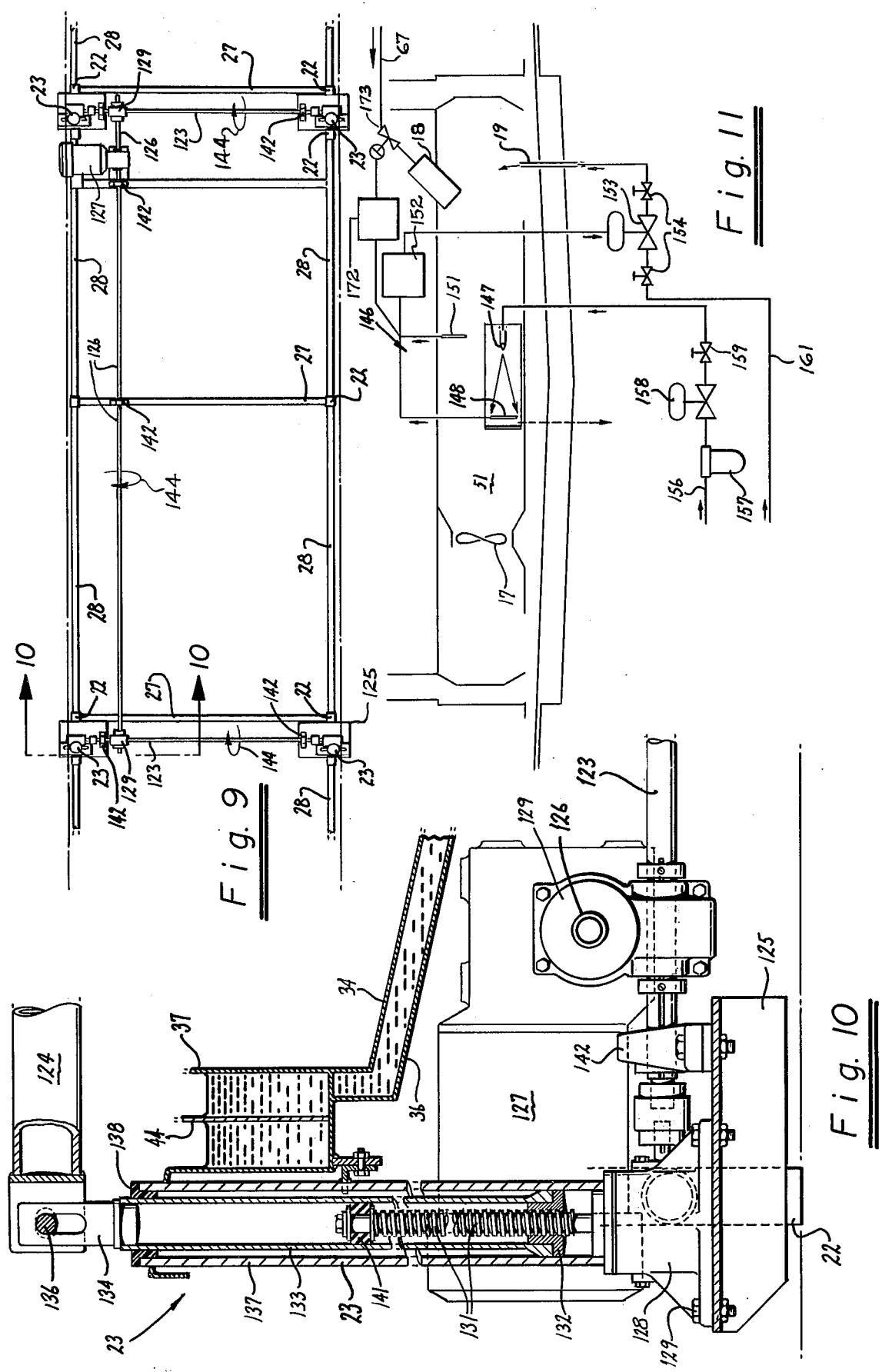

FOOD TREATMENT APPARATUS AND PROCESS

This is a continuation of application Ser. No. 328,925 filed Feb. 2, 1973, now abandoned.

BACKGROUND OF THE INVENTION

This invention concerns method and apparatus improvements for the treatment of food including treatment of solid food products in a superheated water vapor or steam-laden atmosphere.

In food treatment, and particularly in the case of meat products, it is desirable that the end product should be attractive in appearance including the color, texture and shape. The moisture content of a solid food product should be controllable during heat treatment. It is desirable that a food product be subjected to handling or movement as little as possible in processing so as to preserve the shape of the product and to avoid crumbling.

SUMMARY OF THE INVENTION AND OBJECTS

In summary the invention relates to an oven providing an elongated processing path and comprising within a housing a cooking chamber having a continuous conveyor extending therethrough, said conveyor being of perforate construction so as to permit passage therethrough of the process atmosphere. A heating chamber is provided in the oven housing arranged in communication with the cooking chamber, the heating chamber having a heating unit therein for raising the temperature of the process atmosphere. Means are provided for injecting water vapor into the process atmosphere and means are provided for recirculating the process atmosphere from said heating chamber through said cooking chamber and again through said heating chamber.

The process of the invention comprises providing a food treatment chamber equipped with a vapor previous conveyor; preparing a moving stream of process vapor at a temperature above 212°F. and circulating said process vapor along and through the conveyor; injecting water vapor into the moving stream of process vapor and supplying heat to the process vapor; placing the food product in discrete pieces upon the conveyor and moving the product continuously in its original position on the conveyor through the food treatment chamber.

An object of the invention is to provide an improved process for applying heat to a solid food product through circulation thereabout of a process vapor containing a large component of water vapor.

Another object of the invention is to provide an improved oven for cooking, baking and broiling a wide variety of food products, which oven achieves the functions of fryers, infrared and open flame broilers, ovens and blanchers.

Another object of the invention is to provide an improved oven of the type described above which is readily cleaned, which minimizes undesirable burn-on, and which provides for the collection of all product drippings for further use as gravies or saleable renderings.

Other objects of the present invention will be apparent from the following detailed description of the preferred embodiment considered in connection with the attached drawings.

BRIEF DESCRIPTION OF THE DRAWINGS

FIGS. 1A and 1B are each longitudinal, vertical sectional views taken in the direction of the arrows 1A and 1B of FIG. 7;

FIG. 7 is a longitudinal, horizontal, sectional view taken in the direction of the arrows 7—7 of FIG. 4;

FIG. 8 is a side elevational view of the oven of the present invention showing the upper portion thereof in the raised condition such as for inspection, maintenance or cleaning;

FIG. 9 is a longitudinal, horizontal, sectional view taken in the direction of the arrows 9—9 of FIG. 8;

FIG. 10 is an enlarged, fragmentary, sectional view through one of the hoists taken in the direction of the arrows 10—10 in FIG. 9; and FIG. 11 is a schematic representation of a moisture control system useful with the present invention.

DESCRIPTION OF THE PREFERRED EMBODIMENT

Figure 1A:
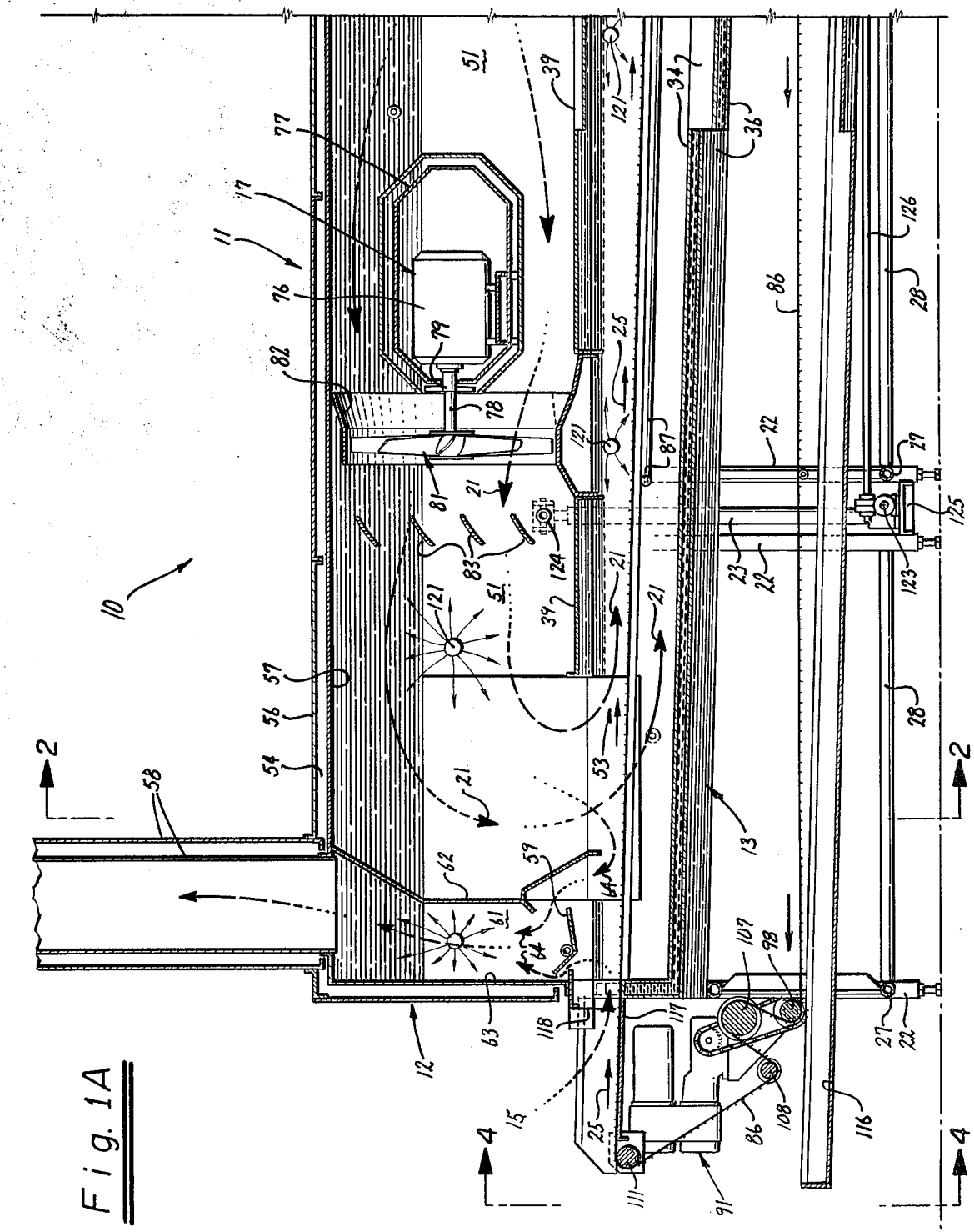

The food treatment unit or oven 10 of the present invention, as illustrated in the drawings (FIGS. 1A, 1B, 7 and 8) comprises in general a shell 11 divisible in a horizontal plane into an upper shell portion 12 and a lower shell portion 13, a framework 14, an endless conveyor 16, a circulating fan 17, a natural gas burner 18 and steam discharge nozzles 19. In viewing the drawings it will be understood that the product feed end of the oven 10 is shown on the left of FIG. 1A and FIGS. 7 and 8, and the product discharge end is shown on the right in FIG. 1B and FIGS. 7 and 8. Thus the direction of movement of the top run of the endless conveyor 16 is from the left to the right as indicated by the arrows 25, and the process vapor within the oven is circulated by the fan 17 in the direction of the arrows 21 of FIGS. 1A and 1B concurrent with the direction of conveyor movement.

Considering now the oven apparatus in more detail, and referring particularly to the framework, reference will be made to FIGS. 1A, 1B, 2, 3, 7 and 8. In general, the framework comprises interconnected horizontal and vertical members including the seven pairs of legs 22 arranged respectively at the center, at each end of the oven, and two pairs at each of the two lifting sections defined by the four hoists 23, also arranged in pairs. As shown best in FIG. 8, the function of the four hoists 23 is to elevate the upper shell portion 12 and this will be described in more detail below. Each of the legs 22 is equipped with height adjusting means for leveling the oven and which comprises an adjustment screw 24 which is threadably mounted in the base of the leg and held securely in a selected position by a lock nut 26. Horizontally arranged cross members 27 extend transversely of the oven and interconnect the legs 22 in pairs. Longitudinally extending horizontal members 28 maintain the legs in a fixed supporting attitude providing a rigid, light framework for the oven structure. The frame members 22, 27 and 28 may be made up from tubing which is desirable in shape because of its ease of external cleaning, good strength to weight ratio and favorable appearance.

As mentioned above, the shell or housing 11 is divisible along a horizontal plane and comprises the upper shell portion 12 which is shown in FIG. 8 in the raised condition being supported therein by the two pairs of hoists 23. The upper shell 12 is raised both for purposes of cleaning, inspection and maintenance of the oven interior. The upper 12 and lower 13 shell portions are shown in the closed conditions for operating in FIGS. 1–3 wherein a water seal 31 is provided for retaining the process atmosphere within the oven, confining the cooking gases against escape to the surrounding plant, and also to prevent entrainment of air into the oven which degrades the process atmosphere. The water seal 31 also acts as an explosion release should there suddenly occur a great rise in pressure within the oven.

Figure 2:
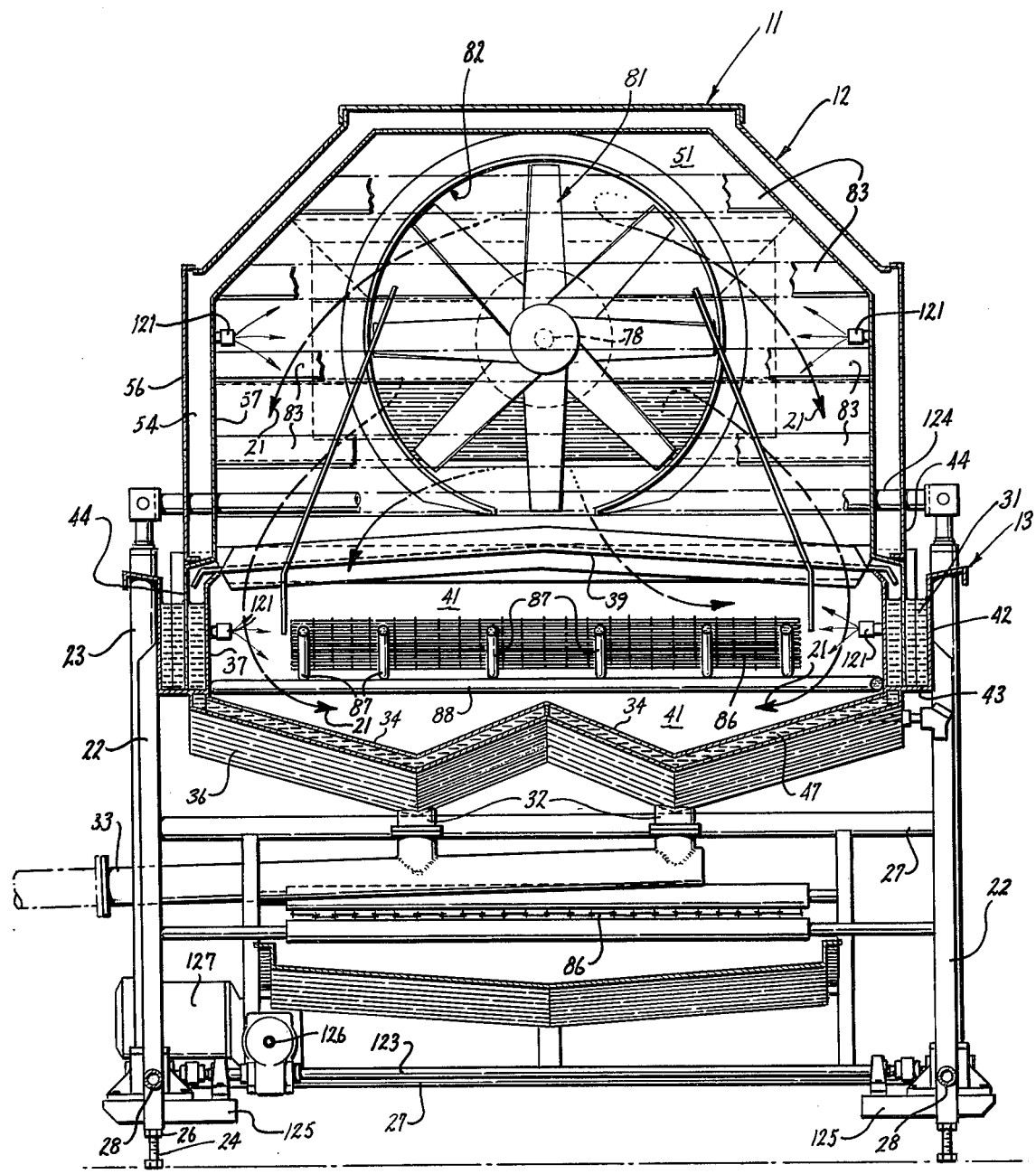
FIG. 2 is a transverse, sectional view taken in the direction of the arrows 2—2 of FIG. 1A.
Figure 3:
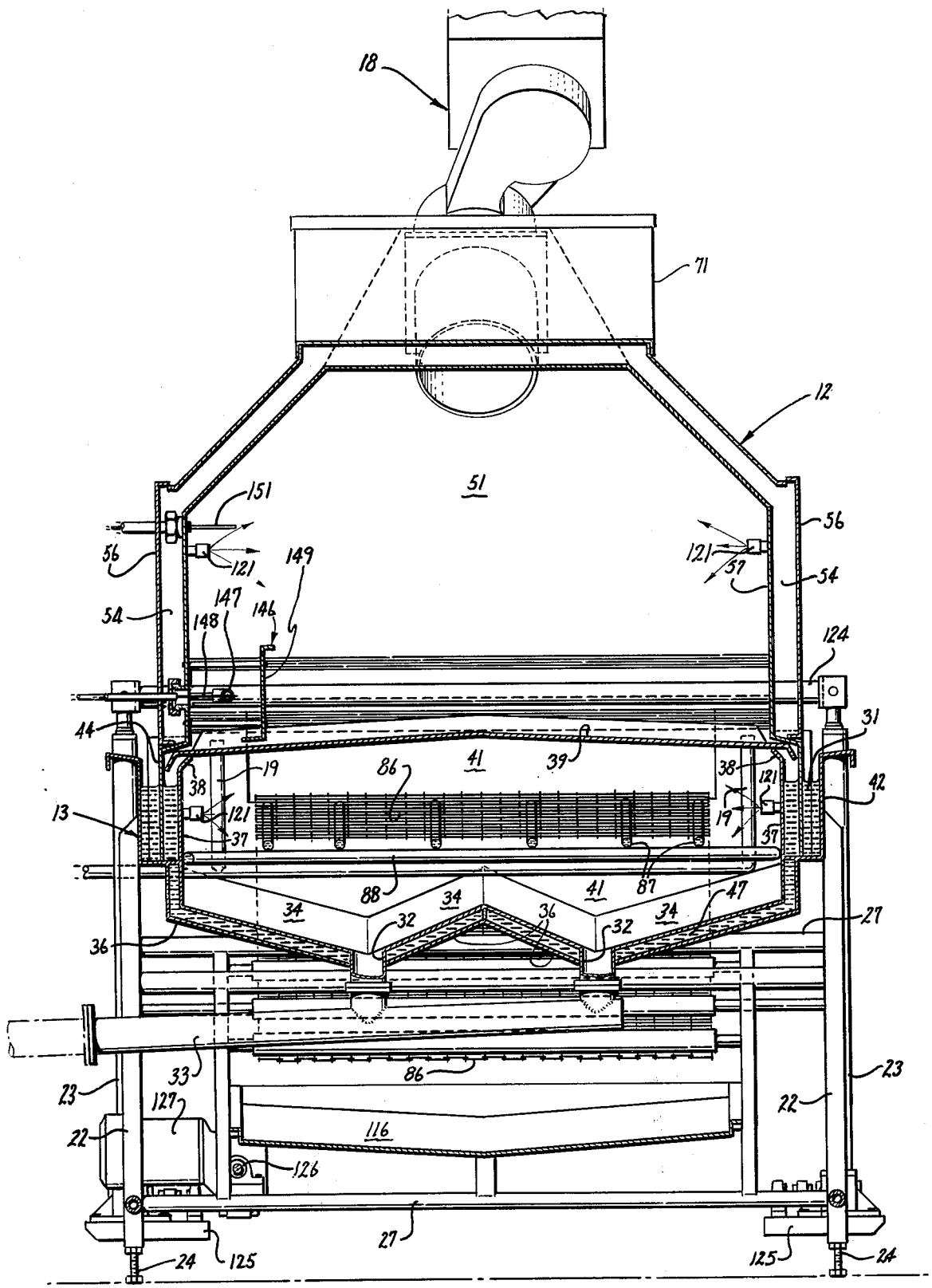
FIG. 3 is a view like FIG. 2 taken in the direction of arrows 3—3 of FIG. 1B.

The lower shell or housing portion 13 is supported on the framework 14 being connected to the uprights or legs 22. The lower shell portion is of double wall construction, as shown in FIGS. 2 and 3, and the bottom slopes from each end towards a low point midway along its length (FIGS. 1A and 1B) where a pair of drain nozzles 32 are positioned for carrying off into a manifold 33 juices, fats or other liquids falling from the product into the lower shell portion. As viewed in transverse cross-section, FIGS. 2 and 3, the lower shell portion has a configuration resembling the letter W. The spaced double walls provide a passageway for circulation of a liquid coolant such as water so that the bottom portion inside wall 34 may be maintained at a relatively low temperature (e.g. 180°F.) which would preserve fats and juices from the product relatively intact and will prevent them from becoming overheated or burned on to the inside surfaces. Thus it will be understood that the inside wall 34 and the outside wall 36 are spaced apart throughout the length of the oven 10 to provide space for circulation of coolant along the bottom of the lower shell portion 13. Side walls 37 extend upwardly from the inside bottom wall 34 and terminate in an inwardly inclined flange 38 which serves as the support for horizontally disposed pans or covers 39 which, with the walls 34 and 37, serve to define a cooking chamber 41 within the food treatment unit 10.

Spaced laterally outwardly of the side wall 37 there is provided the wall member 42 which joins with the wall member 37, the wall member 42 having a bottom horizontally disposed wall 43 (FIG. 2) integral therewith which unites the inside wall 37 forming a longitudinally extending channel which, when filled with water, defines the water seal 31 for receipt of the vertical skirts 44 from the upper shell portion. The water contained in the water seal 31 is circulated independently of the system for circulating water along the bottom of the lower shell portion.

Figure 5:
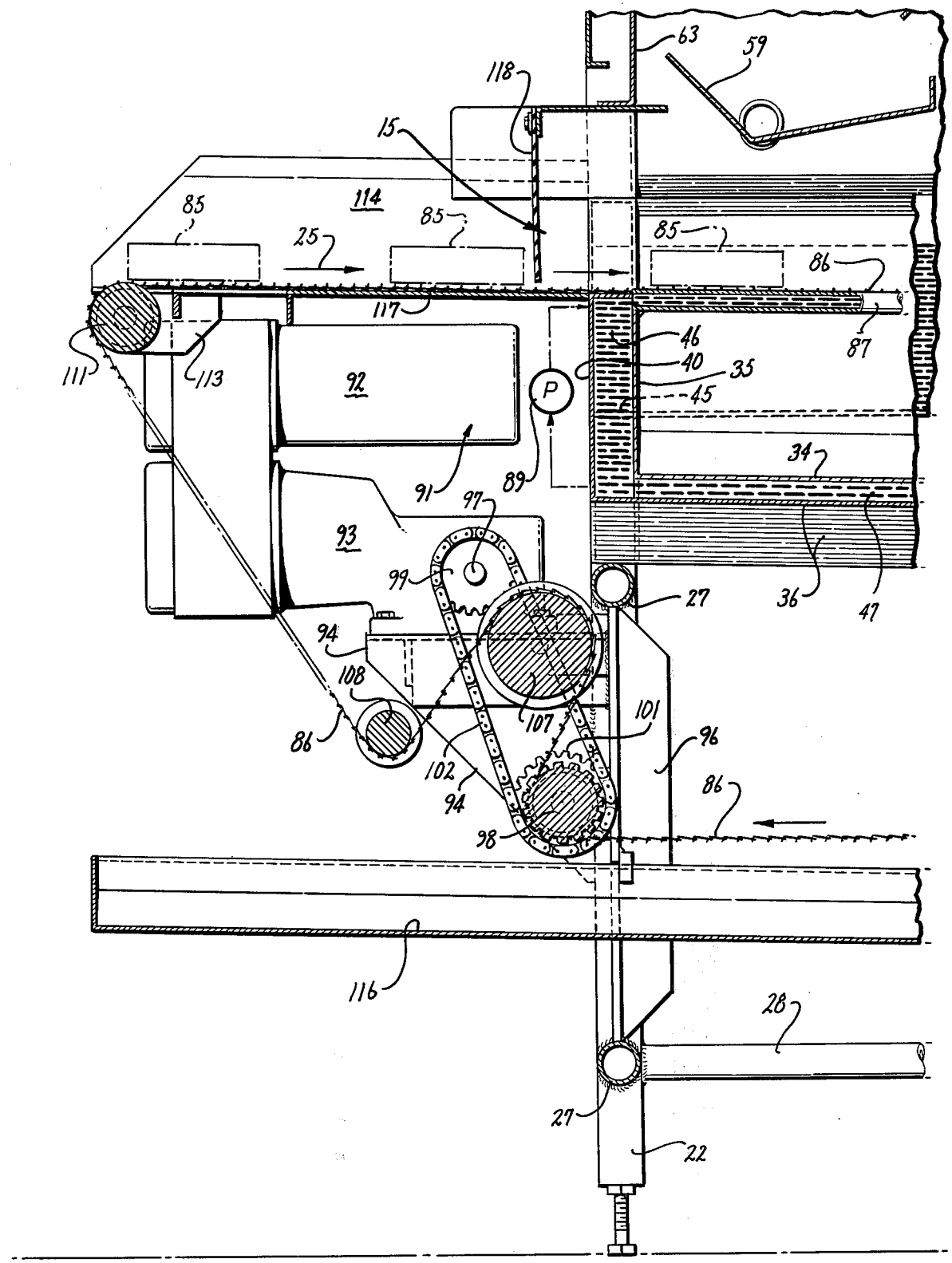
FIG. 5 is a view taken in the direction of the arrows 5—5 of FIG. 4.
Figure 6:
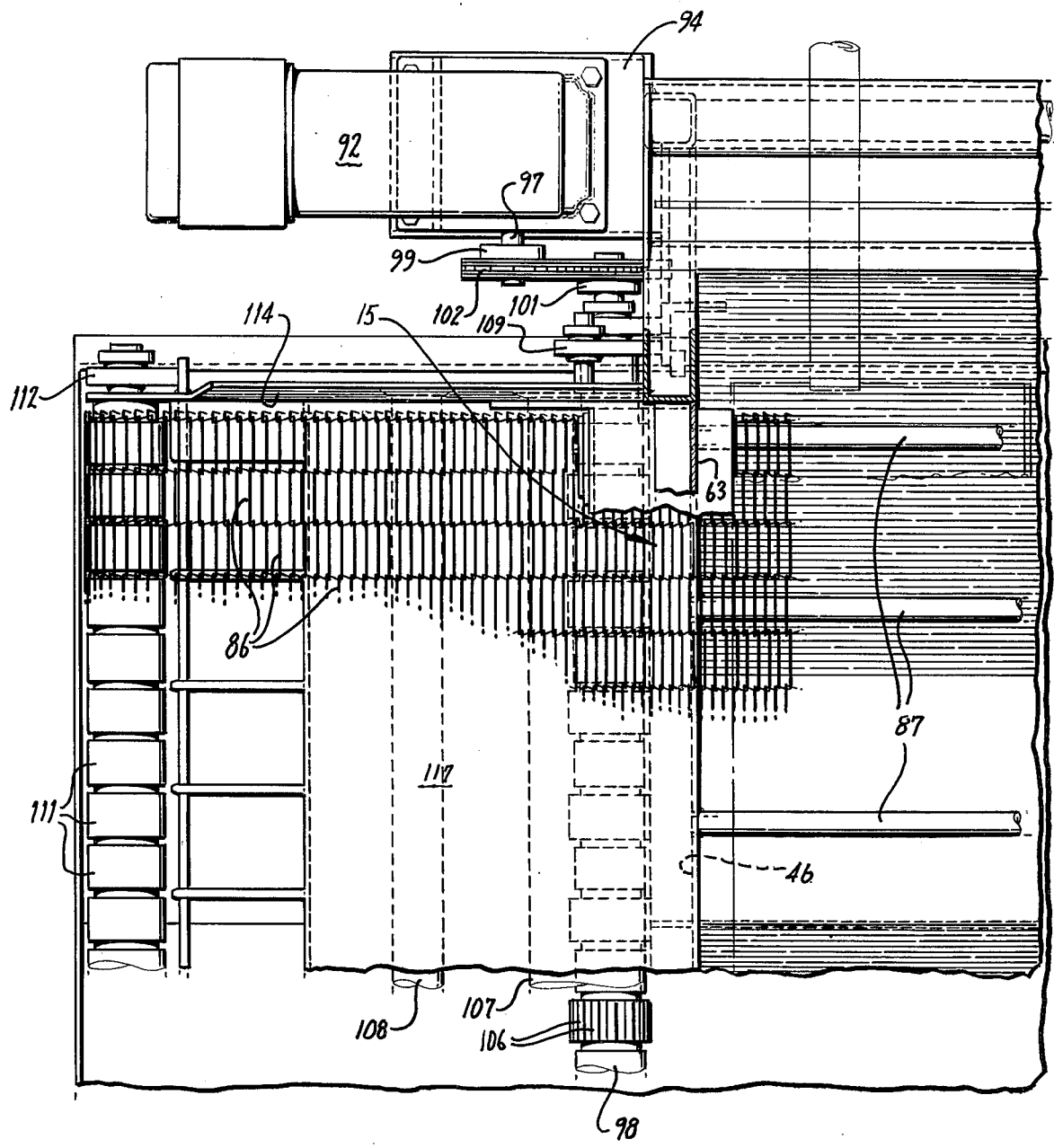
FIG. 6 is a view taken in the direction of the arrow 6—6 of FIG. 4.

The arrangement of the walls at the ends of the lower shell are substantially the same at each end and a typical section is shown in FIG. 5. There it will be seen that inside 35 and outside 40 end walls are arranged spaced apart to provide coolant circulation therebetween and a horizontal baffle 45 is interposed midway along the end walls so as to divide the end portions into upper and lower circulation compartments. The upper compartment 46 is arranged so that the coolant may communicate with the coolant passageways in the tubular supports for the conveyor, as will be explained more fully below.

The upper shell or upper housing 12 is of substantially larger volume than the lower shell which encloses the cooking chamber 41, as may be seen from FIGS. 1A, 1B, 2 and 3. The upper shell 12 is of double wall construction and provides an insulating air space 54 between the outer radiation shield 56 and the inner chamber wall 57. Inside, the upper shell portion provides a process vapor heating chamber 51 which is equipped with the burner 18 operating within the chamber 51 and the fan 17 which serves to circulate the process vapor from the heating chamber into and from the cooking chamber. The process vapor returns from the cooking chamber through the gap 52 (FIG. 1B) between the cooking and heating chambers and in so doing, the process vapor passes across the two steam discharge nozzles 19 which serve to charge the process vapor with saturated steam. It will be appreciated that the covers 39 or pans supported by the side walls 37 define the lower boundary of the heating chamber 51, as may be seen in FIGS. 1A, 1B, 2 and 3.

To minimize cooking odors in the surrounding plant and to positively vent the oven to the out-of-plant atmosphere or to a fume disposal apparatus, each end of the upper housing portion 12 is equipped with a double-walled stack 58 (FIGS. 1A and 1B). Each stack is equipped with an exhaust fan (not shown) which operates to effect circulation from the oven interior, as indicated by the arrows 64 in FIGS. 1A and 1B. Air drawn into the oven through the oven inlet 15 or outlet 20 passes largely up the stack, being drawn across the gap established by the reception baffle 59 and into the flue section 61 defined by the end baffle 62 spaced from the inside end walls 63 of the housing 12. Thus a draft of air is swept in through both the oven inlet 15 and outlet 20 and up the flue 61, and this draft entrains a minor portion of the process atmosphere taking it up the stack 58 which is replaced, it is believed, by the process steam supplied from the nozzles 19. The stacks 58 are telescopically related to the associated plenums 60 (indicated in FIG. 8 by broken lines) so as to accommodate the vertical movements of the upper shell portion 12.

Referring now to FIGS. 1B, 3 and 8, the burner assembly 18 is arranged with respect to the heating chamber 51 so as to discharge therein a jet 66 of flame and combustion gases generally concurrently to the direction of flow of the process atmosphere and in the embodiment the burner projects at an angle of approximately 45° and oriented forwardly in the direction of flow, as indicated by the arrows 21. The burner assembly 18 is supplied with natural gas or other suitable gaseous fuel from the gas conduit 67 which is in communication with a gas source. The burner assembly includes an electric motor 68 operatively coupled to a blower 69 for supplying the necessary volume of air to the burner. The entire burner unit is mounted on a framework 71 on the top of the oven housing. A suitable burner assembly is one manufactured by the Maxon Premix Burner Co., Inc. of Muncie, Ind., model No. 435 which can provide an output of 3.5 million B.T.U.'s per hour. A spray shield 72 is mounted for pivoting movement so as to cover the discharge of the burner during oven cleaning operations. As shown in FIG. 1B, the spray shield is disposed in the out-of-the-way position for over operations.

Referring to FIGS. 1A and 2, it will be seen that the vapor circulating fan assembly 17 is mounted in the upper shell portion in a protective nacelle 77 so that the electric motor 76 is shielded from the oven atmosphere by the double wall of the nacelle. On each side of the oven the nacelle 77 is open affording air coolant to the motor 76. A drive shaft 78 extends from the fan motor 76 through an opening 79 into the heating chamber 51 and a fan impeller 81 is secured on the shaft 78 to rotate within a shroud 82. An array of stator vanes 83 (FIGS. 1A and 2) are arranged between the side walls 57 downstream of the fan for regulating the flow of the process atmosphere to the inlet opening 53 between chambers 41 and 51.

An eight-bladed, 27-inch fan wheel driven by a 7½ horse power motor was found suitable for the circulating fan assembly 17 and to provide a mass flow of 1200–1300 cubic ft. per mi.

Referring to FIGS. 1A and 1B, 4, 5 and 6, the endless conveyor 16 for carrying the product 85 through the oven includes the endless conveyor belt 86 which, for example, may be formed from flat, flexible wire belt material employing wire 0.072 inches diameter arranged on a ½ inch pitch. The belt 86 extends the entire length of the oven and thus extends through both the oven inlet 15 and outlet 20, shown in FIGS. 1A, 1B. The belt itself is of open construction and is therefore previous to the process vapor so that the product 85 will be contacted by the process vapor through the belt. This is important in cooking the undersides of chicken parts and the like products and eliminates the requirement of turning the product over to cook the underside.

The belt is supported along its length inside the oven so as to readily permit circulation of the process vapor through the belt. More particularly, the belt support includes a plurality of longitudinally extending, water-cooled, pipe supports 87 which are supported vertically from the side walls 37 of the lower shell portion by the tubes 88 arranged, as appears in FIG. 7, in a square loop configuration. The tubes 88 are supported at the side walls 37 by brackets (not shown). Coolant is circulated through both the longitudinally extending belt supports 87 and through the tube supports 88 to maintain those members at a sufficiently low temperature so that cooking products are not burned on and therefore these members remain in a relatively clean condition throughout over operation. The conveyor supports 87, 88 are in communication with a coolant header provided by the upper compartment 46 of the oven end wall (FIG. 5). A pump 89 is provided for circulating liquid both in the conveyor supports and in the coolant spaces or passageways 47 along the bottom wall. At the product discharge end of the oven a similar manifold or header compartment 46 is provided in the end wall and is arranged in communication with the longitudinal pipe supports 87.

Figure 4:
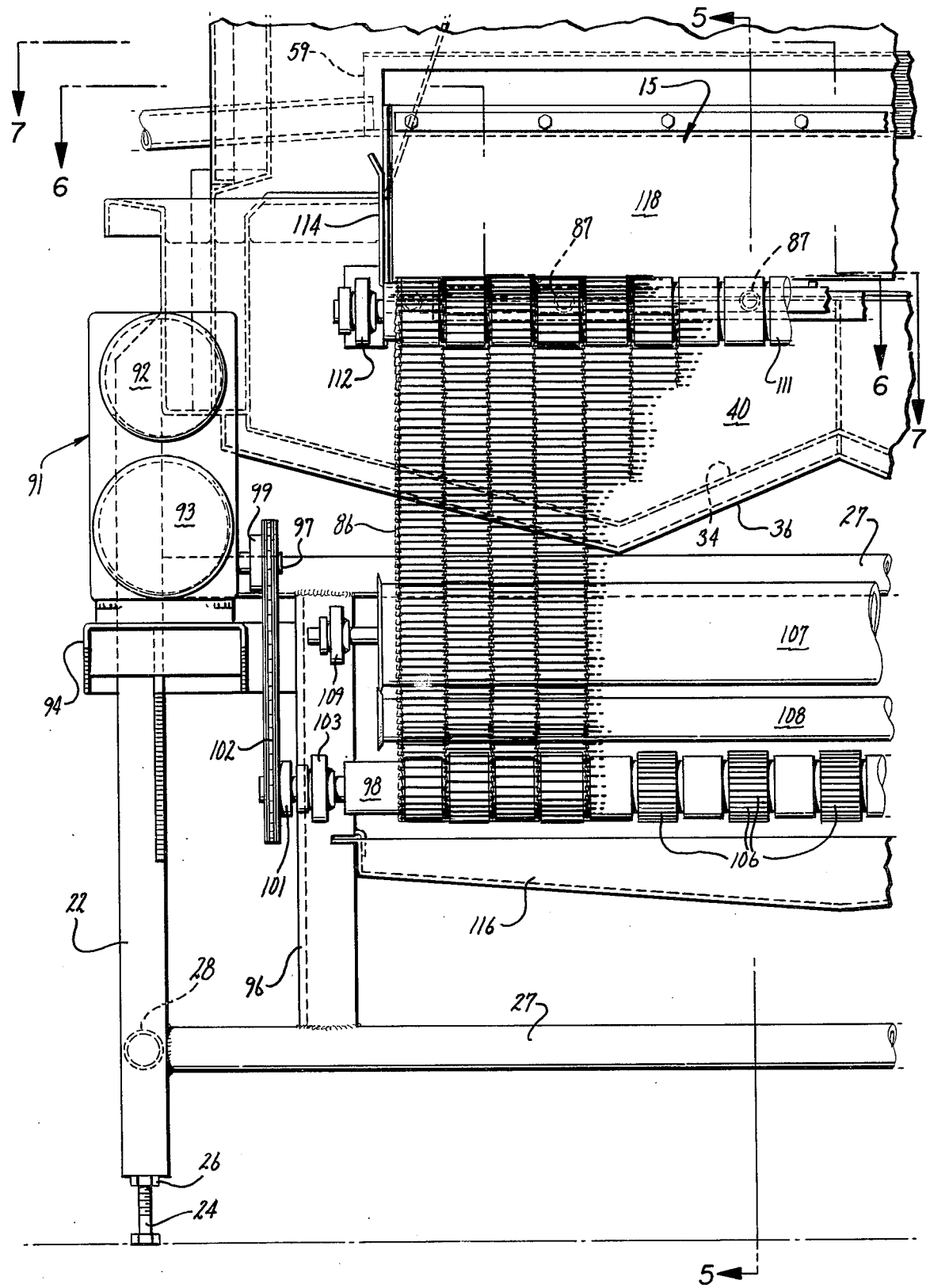
FIG. 4 is an enlarged, fragmentary view taken in the direction of the arrows 4—4 of FIG. 1A.

A conveyor drive unit 91 is arranged at the feed end of the oven (FIGS. 4, 5 and 6) and includes, for example, an electric motor 92 coupled to an adjustable, variable speed reduction unit 93 which is mounted upon a support bracket 94 which is suitably secured to the oven framework 14. The output shaft 97 of the speed reduction unit 93 is coupled to the conveyor drive roller 98 through the sprockets 99 and 101 and chain 102, as shown in FIGS. 4 and 5. The drive roller 98 is rotatably supported at each of its ends by bearing structure 103 mounted upon a structural angle member 96 arranged vertically between the frame cross-members 27, as shown in FIG. 4. The drive roller is provided with suitable teeth 106 for engagement with the wire mesh belt 86 so that the wire mesh belt may be positively driven by the roller 98. To regulate the tension within the wire mesh belt 86, apparatus is provided including two rollers 107, 108 which are adjustably mounted with respect to the framework and so arranged to provide the necessary wrap of the belt around the drive roller, as shown best in FIG. 5. The bearings 109 serve to support the larger of the two tension rollers 107 with respect to the member 96, as shown in FIG. 4. By moving the smaller of the two rollers 108 in the vertical plane, as viewed in FIG. 5, the degree of tension within the wire mesh belt may be regulated.

At each end of the oven there is mounted an idler roller 111 about which the belt is reeved to establish the plane of the belt through the oven proper. Each idler roller 111 is rotatably supported at its ends by bearing structure 112 (FIG. 4) mounted upon a bracket 113 made integral with the side plate 114 rigidly connected to the lower portion of the housing.

At each the oven inlet 15 and outlet 20 there is arranged beneath the conveyor belt 86 a belt support plate structure 117 rigid with the side plates 114 and serving to establish, respectively, a product loading and a product discharge station for the oven. A flexible flap member 118 is arranged, as shown in FIG. 5, over each inlet 15 and outlet 20 so as to retain the process atmosphere within the oven and to minimize air entrainment therein, while affording easy passage of the product 85 carried by the belt with respect to the processing chamber.

As shown in FIGS. 1A and 1B, a drip pan 116 is provided on the framework and is disposed below the lower run of the belt 86. The drip pan is sloped towards its center and is equipped with a drain (not shown) to facilitate cleaning.

A clean-in-place liquid spray system is incorporated into the oven 10 so that following an operational run the oven interior may be throughly cleaned to meet governmental and industry standards of cleanliness. The spray system includes an array of spray nozzles 121 disposed in both the heating chamber 51 (FIGS. 1A and 1B) and in the cooking or processing chamber 41 (FIG. 2). During the cleaning operation the nozzles are supplied with cleaning and rinsing solutions through suitable conduits (not shown) and the solutions are recirculated through the cleaning system at desired rates and temperatures from a supply of such solutions located outside of the oven. The drain 33 in the bottom of the lower housing unit serves, during the cleaning operation, to carry off the cleaning fluids and entrained cleanings.

Mentioned above was the function of raising or elevating the upper housing portion 12 from the lower housing portion (FIGS. 1A, 1B, 8–10). As may be seen best from FIGS. 9 and 10, the system for raising the upper housing portion 12 comprises four hoists 23 arranged in pairs, the upper ends of which are connected to a transversely extending lifting tube 124 (FIGS. 2 and 3) which extends through the upper housing portion. Each of the hoists or jacks 23 is mounted upon a platform 125 rigidly secured to and disposed between two adjacent legs 22. Each hoist or jack assembly 23 includes a base 128 secured by fasteners 129 to the platform 125 and a vertically extending internal jack screw 131 operatively mounted at its lower end in a bearing (not shown) and a cooperative lifting nut 132 fixedly secured to a tubular strut 133 which is joined by a pin 136 to the laterally extending lifting tube 124, as shown in FIG. 10. An outer housing 137 encloses the tubular strut 133 and is rigidly mounted upon the base 128 of the hoist, the housing being equipped with an annular guide cap 138 through which the strut 133 may slide freely. Within the strut the upper end of the jack screw 131 is equipped with an alignment spool 141 which slides freely with respect to the inside surfaces of the strut 133 so as to maintain the jack screw 131 centered within the strut 133. Rotation of the jack screw 131 serves to raise or lower through the lifting nut 132 the tubular strut 133 and in turn the upper housing portion through the lifting tube 124, it being understood that there are four jack screws which operate in unison through a drive system to be described immediately below.

More particularly, it will be seen from FIG. 9 that there is provided a right angle drive motor 127 which is coupled through a shaft 126 to two right angle gear drive units 129 which in turn are each coupled by laterally extending shafts 123 to the hoist units 23. Pillow blocks 142 are provided at intervals to support the shafting, as shown. As indicated by the arrows 144, FIG. 9, rotation of the shafting through operation of the drive motor 127 in the directions indicated serves to raise the upper housing assembly to a raised position as shown in FIG. 8. Conversely, rotation of the shafting in the direction opposite to that indicated by the arrows 144 will serve to lower the upper housing unit again into the position as shown in FIGS. 1A and 1B. Suitable limit switches (not shown) are provided for stopping the drive motor 127 when the limits of travel of the jack screws have been reached.

Means are provided for detecting and regulating the moisture content of the process atmosphere within the oven 10. Referring particularly to FIGS. 1B, 3 and 11, the moisture control unit 146 may be arranged in the moving process atmosphere within the heating chamber and includes a fine spray nozzle 147 which projects a spray of water against a spaced apart iron-constantan, J thermocouple 148, both arranged within an open-ended duct 149, FIG. 1B. The nozzle 147 projects a spray concurrent to the flow of the process atmosphere within the heating compartment and thus the "wet bulb" thermocouple 148 is disposed downstream of the spray nozzle 147. A second or "dry bulb" thermocouple 151 is disposed within the oven preferably within the heating chamber 51 and also extends into the path of the circulating atmosphere. The thermocouple 148 is electrically coupled to a controller recorder 152 which serves to sense the electrical output of the thermocouple and to respond to established control limits through a pneumatic output to a prearranged setting. The controller output is coupled to a pneumatically operated steam valve 153 in the steam supply line 161 so as to operate the valve 153 for regulating the steam supply to the steam nozzles 19 so as to achieve and maintain a pre-set moisture content of the process atmosphere. Shutoff valves 154 are provided in the steam line 161.

The thermocouple 151 is electrically coupled to a controller recorder 172 which serves to sense the electrical output of the thermocouple 151 and to respond through a pneumatic output to a prearranged setting. The output of controller 172 is coupled to a pneumatically operated gas valve 173 in the gas supply line 67 as to operate the valve 173 for regulating the gas supply to the heating unit 18 so as to achieve and maintain the pre-set oven temperature.

Steam in this embodiment is supplied to the line 161 at a pressure from 25–35 psig and at a saturated quality of and at a temperature of between 260°–281°F. A spray of hot water may be substituted for the saturated steam. A satisfactory spacing for the nozzle 157 from the "wet bulb" thermocouple 148 has been found to be on the order of 16 inches and a satisfactory flow through the nozzle 147 is on the order of 0.06 gallons per minute. Water is supplied to the line 156 at a pressure of about 15–20 psig and at a temperature which may vary between 50°–200°F., but preferably at about 60°F. In the water supply line 156 there is provided a strainer 157, a pressure regulating valve 158 and shutff valve 159.

The moisture control unit 146 works on the principle that a water droplet sprayed into a hot atmosphere will change in temperature until it reaches a point where the partial pressure of the water vapor from the droplet equals the partial pressure of water vapor in the process atmosphere or the dew point temperature. If the droplet temperature is initially higher than the equilibrium or dew point temperature, then water evaporates from the droplet surface, dissipating heat energy from the droplet until its temperature falls to dew point temperature. On the other hand, if the initial droplet temperature is lower than the equilibrium temperature, moisture from the atmosphere condenses on the surface of the droplet supplying energy until the droplet rises to the dew point temperature. The droplet temperature adjustment is cirtually independent of the normally measured dry bulb oven temperature and is a function of moisture content of the process atmosphere. Thus, the measurement of the droplet temperature after it has reached equilibrium is then a measure of the partial pressure of water vapor in the atmosphere and which may be converted to give the composition of moisture by volume in the process atmosphere. This measurement is made through the use of the controller 152 or through psychometric tables the temperature reached by the dry bulb thermocouple 151 and that reached by the "wet bulb" thermocouple 148.

Fresh filtered water is continuously introduced through the water supply line 156 and once the water has been sprayed against the web bulb thermocouple it is dumped through the duct 149 into the space 41 below the conveyor belt. This procedure keeps the thermocouple 148 in a clean condition from being constantly washed by the water spray.

Operation

The present invention is predicated on the fact that water vapor or steam has an enlivening effect upon the appearance and flavor of certain food products such as meat patties, salisbury steak, chicken parts etc. This effect is vastly enhanced when the cooking takes place largely in the absence of air so as to reduce or minimize the degenerative effect of oxidation and drying out of the product.

The present invention also makes possible a very rapid processing cycle which is contributable to a high heat transfer rate from the moisture-laden process vapor to the relatively cooler product such that moisture from the process atmosphere may leave the vapor state and condense upon the product releasing the heat of the vaporization. This phenomenon is particularly present as the product first enters the cooking chamber which is the moment when the temperature differential between the process atmosphere and the product is the greatest. The condensing of moisture upon the product tends, it is believed, to seal in moisture contained within the product and minimizes the tendency for a product to dehydrate such as when processed in a substantially dry, rapidly moving, e.g. 1200–2400 feet per minute, gaseous stream. The process may be readily controlled by means including the moisture control system 146 so as to maintain one preferred high percentage of water vapor or steam in the process atmosphere, e.g. 45–65%, and permitting food treatment to occur at a relatively high processing temperature, e.g. 400°–600°F., without deterioration or burning of the product, in this one preferred range.

The apparatus has been in successful operation in a range of moisture content as low as 8–11% in the 450°–600°F. range for meat patties to achieve particular finished color characteristics. Temperatures as low as about 250°F. and as high as about 1100°F. have been employed for such products as unbreaded chicken and turkey breasts on the one hand, and meat patties on the other, to achieve particular treatment times and finished appearance characteristics.

The process also provides for recovery of the juices and fats drippings for re-use in gravies and the like.

To ready the oven for processing a solid food product such as chicken parts, meat patties, frozen products etc., the conveyor is set into operation and the exhaust fans (not shown) connected to the stacks 58 are set into the condition for withdrawing air through the oven inlet 15 and outlet 20 and a portion of the process vapor from the oven to the stacks to minimize cooking odors escaping into the plant. Then the oven is brought up to the desired temperature by firing the burner unit 18 and setting the fan 17 into operation so as to circulate the atmosphere within the oven. As operational temperature is approached, steam is injected into the processing chamber through the nozzles 19 to reach the established or selected moisture content for the operational temperature.

Solid food products 85 in discrete pieces are placed upon the belt at the loading station established at the left end of the oven, as viewed in FIG. 1A. As products 85 are moved by the belt they are carried through the fabric curtain 118 into the processing chamber and through the entire length of the oven in their original positions, leaving the oven through the outlet 20 to the discharge station on the right, as shown in FIG. 1B. The process vapor is circulated above, below and through the conveyor belt 86 being that the belt is of open construction and is arranged for easy passage of the process vapors therethrough. The product 85 is cooked or treated by the process atmosphere on all sides without the necessity of turning the product over to treat the bottom side. The fan 11 propels the process vapor through the processing chamber or cooking chamber 41 through the opening 52 back into the heating chamber 51. As the stream or draft passes through the opening, steam or a hot water spray from the nozzles 19 is injected into the moving stream. As shown in FIGS. 2 and 3, the volumes of the cooking compartment above and below the conveyor belt 86 are substantially the same. Thus the rate of vapor flow above and below the conveyor belt will be substantially the same providing even heat transference from the process atmosphere to the product on all sides. Drippings from the product fall through the conveyor belt 86 to the cooled walls 34 and are carried to the drains 32 and out of the unit. Further, the juices may be used to baste products during processing.

EXAMPLES

The utility of the process disclosed herein may be appreciated best by reference to results achieved in tests with a prototype unit. For example, in a series of tests the prototype unit was adjusted so that the process atmosphere moved at an average velocity of about 1200 feet per minute with the temperature of the cooking chamber at about 500°F., and with a moisture content of the process atmosphere at about 46%. Two different meat products were process with the resulting product having a highly desirable, commercially acceptable appearance and good moisture content. These two products were meat patties containing beef and meat patties containing principally pork.

Considering first the batch of beef meat patties, these were five-ounce individual patties of approximately ½ inch thickness and having an aggregate batch weight of 1 lb., 4½ ozs. The temperature of the patties was 35°F. prior to entry into the process. Immediately after leaving the cooking chamber the patties had an aggregate batch weight of 1 lb., 1.9 ozs. and had achieved a center temperature of 144°F. The loss of eight amounted to 12.7% and the time in process was 3 mins. 45 secs.

The batch of pork patties was processed for a similar 3 mins. 45 secs. time period and was also nominally 5 oz. patties of ½ inch thickness, the batch weighing 1 lb., 3.6 ozs. The temperature of the patties was 42°F. before entering the cooking chamber. The weight of the batch upon exit from the cooking chamber was 15.9 ozs., or a loss of 18.9%, and the center temperature of the patties was 152°F. The meat patties in each instance were cooked to a satisfactory degree, as evidenced by the internal temperature and the appearance in color. The moisture content and appearance was vastly superior in a commercial sense for bulk food processing.

Another example of employing the process on a meat product was a test in the prototype unit of cooking salisbury steak in pieces of about 3 ozs. each with the batch total weight of 3 lbs., 5 ozs. The moisture content of the process atmosphere was maintained at about 46%, temperature at about 450°F. and the process atmosphere velocity at about 1200 feet per minute. Temperature of the product prior to entry into the cooking chamber was 28°F. The temperature of the product upon exit from the cooking chamber was 140°F. and the weight of the batch upon exit was 3 lbs., 1.8 ozs., or a loss of 6%. The processing time was 2 mins. 30 secs. The product was found satisfactory in appearance and the degree of cooking even with the rapidity of the cooking operation.

A fourth example concerns the use of the process in a test for cooking chicken parts comprising two chickens having a batch weight of 1330 grams with an average weight per part of 83 grams. This batch of chicken parts was placed in a batter before cooking which raised the batch weight to 1715 grams before entry into the prototype cooking unit. On entry into the cooking unit the temperature of the chicken parts was about 80°F. and upon exit from the cooking unit the temperature at the bone was between 185°–195°F. The oven temperature was 375°F. with the moisture content between 45–46%. Cooking time was 14 mins. 30 secs.

The weight of the batch upon exit from the cooking unit was 1505 grams and the loss was 250 grams or 11.4%.

A fifth example concerns a test for cooking meat patties each weighing about 2 ozs. with a batch weight of 2 lbs., 0 ozs. The temperature of the product before entering the cooking chamber was about 40°F. and the temperature of the patties' center upon exit from the chamber was about 145°F. The weight of the batch following processing was 1 lb., 12.8 ozs., or a loss of 10%. The process atmosphere was maintained at a velocity of about 1200 feet per minute and a temperature of 600°F. with 10% moisture content, no steam being introduced into the process atmosphere. The moisture was derived from products of combustion and evaporation from the product itself. The cooking time was 1 min. 10 secs. The product had a good appearance and a thorough cooking in a relatively short period.

The initial temperature differential between the product entering the unit and the process vapor, as demonstrated in the above examples, falls in the range of 295° to about 560°F. It was observed that this effected a rapid surface treatment of the product with some moisture from the process atmosphere condensing on the product and releasing the latent heat of vaporization. The temperature differential decreases as a product continues through the unit reaching a minimum at the product exit. The heat input and atmosphere circulation rate is selected to permit a temperature drop throughout the unit.

The five examples above demonstrate to the skilled art worker that the process disclosed herein achieves a cooked product having an excellent appearance, good moisture content with a short processing time.

From the above it will be apparent to the skilled art worker that changes and modifications can be made to the unit 10 as well as to the food treatment process disclosed herein. Irrespective of those modifications, the invention shall be limited only by the terms of the following claims.

We claim:

1. An oven operative at substantially atmospheric pressure for food treatment comprising an elongate oven housing having top, bottom, side and end walls, means serving to supply a process vapor into said housing, a partition dividing said housing into a proces vapor heating chamber and a food processing chamber, said housing end walls having openings therein defining product inlets and outlets to said processing chamber, at least one exhaust opening on said housing, baffle members arranged in said oven and coacting with the wall portions thereof to furnish a flow passageway from said product inlet to the exhaust opening and from said product outlet to the exhaust opening, said exhaust opening and baffle member permitting a draft to sweep air entering said oven through said product inlet and said product outlet up through said exhaust opening and out of the oven serving to control air from entry into the process vapor, said conveyor means including a conveyor belt arranged to carry solid food products thereon through processing chamber and being of previous construction to permit circulation therethrough of the process vapor, first power means serving to drive said conveyor means, heating means arranged in said heating chamber serving to raise and maintain the vapor therein at a selected processing temperature, means for positively circulating the process vapor, second power means serving to drive said vapor circulating means, baffle means coacting with said partition serving to permit said circulating means to generate a draft of the process vapor from said heating compartment through said process compartment and along said conveyor and thence serving to effect recirculated return of the process vapor to said heating chamber.

2. The oven of claim 1 wherein said process vapor supply means includes injection means serving to direct a supply of water vapor into said oven to impinge on the draft of the process vapor to be carried along therewith as the process vapor is recirculated, and means coupled to said supply means serving to regulate the moisture content of the process vapor to a pre-set value.

3. The apparatus of claim 2 wherein said regulator means includes first and second thermocouple means arranged in said housing, means for projecting a spray of liquid from a supply thereof upon said first thermocouple means, first comparator means coupled to said first thermocouple means and programmed to compare the temperatures indicated by said first thermocouple to a pre-set value, said first comparator means being operatively coupled to said water vapor supply means so as to regulate the rate of flow of the water vapor into the oven process vapor, second comparator means coupled to said second thermocouple means and programmed to compare the temperatures indicated by said second thermocouple to a pre-set value, said second comparator means being operatively coupled to said heating means.

4. The oven of claim 1 wherein said elongate housing is separable along a generally horizontal plane into a lower housing portion and an upper housing portion, means providing for sealing said upper housing portion with respect to said lower housing portion so that the process vapor may be contained substantially entirely within said oven housing, and means for lifting said upper housing portion upwardly from said lower housing portion.

5. The apparatus of claim 4 wherein said sealing means between said upper and lower housing portions includes along each side of said lower housing portion a longitudinally extending, liquid-retaining channel, said upper housing portion including along each side thereof a downwardly projecting, longitudinally extending, impervious member receivable into said channel to extend below the liquid level therein when said upper and lower housing portions are disposed together in a closed condition for oven operation.

6. The oven of claim 4 wherein said conveyor means is disposed in said lower housing portion, said housing being configured and arranged such that once said upper housing is in said raised condition said conveyor means is exposed for visual inspection and maintenance.

7. The oven of claim 4 wherein said upper housing portion contains said heating chamber, said circulating means and said heating means.

8. The oven as defined in claim 1 wherein said conveyor belt including the conveyor run for carrying solid food products extends through said processing chamber, said product carrying conveyor run being spaced below said partition means and above the bottom wall of said oven to define in said processing chamber process vapor circulation spaces above said conveyor run and below said conveyor run, the return run of said conveyor belt being disposed on the outside of said processing chamber.

9. The oven of claim 8 wherein drip pan means are arranged on said oven below said return run of said conveyor belt serving to receive therein drippings from the return run of said conveyor belt.

10. The oven of claim 8 wherein means are provided in said processing chamber for supporting said product carrying conveyor run in a generally horizontal attitutde, said supporting means being formed as to provide coolant passageways therein and means for circulating coolant through said passageways of said conveyor support means.

11. The oven of claim 1 wherein the bottom portions of said processing chamber disposed below the product carrying run of said conveyor belt include wall structure formed to provide passageways for receiving a coolant fluid, and means for circulating coolant fluid through said passageways serving to maintain the inside surfaces of said bottom portions at a temperature where the product drippings from said conveyor belt are held in a flowable liquid state and the burned-on of drippings upon the inner surfaces is minimized.

* * * * *

REEXAMINATION CERTIFICATE (320th)

United States Patent [19]
Caridis et al.

[11] B1 3,947,241
[45] Certificate Issued Mar. 26, 1985

[54] FOOD TREATMENT APPARATUS AND PROCESS

[75] Inventors: Andrew A. Caridis, Foster City; Clark K. Benson, Millbrae, both of Calif.

[73] Assignee: Heat and Control, Inc., San Francisco, Calif.

Reexamination Request:
No. 90/000,533, Mar. 22, 1984

Reexamination Certificate for:
Patent No.: 3,947,241
Issued: Mar. 30, 1976
Appl. No.: 544,393
Filed: Jan. 27, 1975

Related U.S. Application Data

[63] Continuation of Ser. No. 328,925, Feb. 2, 1973, abandoned.

[51] Int. Cl.³ .............................. F27B 9/00; F27B 9/14
[52] U.S. Cl. ........................................ 432/121; 432/144; 432/148; 432/152; 432/176; 432/198

[56] References Cited

U.S. PATENT DOCUMENTS

| | | | |
|---|---|---|---|
| 810,864 | 1/1906 | Hoover et al. | |
| 1,607,826 | 11/1926 | Harber | 432/65 |
| 1,635,697 | 7/1927 | Amdursky | 73/338 |
| 1,789,847 | 1/1931 | Smith | |
| 2,064,532 | 12/1936 | Gilbert | 432/22 |
| 2,312,339 | 3/1943 | Jones | 99/259 |
| 2,954,244 | 9/1960 | Austin | 285/11 |
| 3,001,298 | 9/1961 | Blesch et al. | 34/212 |
| 3,125,017 | 3/1964 | Tauber et al. | 99/443 |
| 3,209,678 | 10/1965 | Benson et al. | 99/406 |
| 3,309,981 | 3/1967 | Benson et al. | 99/405 |
| 3,440,950 | 4/1969 | Moskal | 99/259 |
| 3,573,059 | 3/1971 | Yuki | 99/1 |

FOREIGN PATENT DOCUMENTS

34475  8/1905  Switzerland.

OTHER PUBLICATIONS

The National Provisioner, Issue of Feb. 17, 1968; article entitled "Patties are Ready in a Minute at Grill Meats", and attached affidavit of Richard T. Johnson.
Sam Stein Associates, Inc. 1968 advertisement and attached affidavit of Richard T. Johnson.

*Primary Examiner*—John J. Camby

[57] ABSTRACT

An oven for treatment of solid foods includes an elongated, double-walled housing divided into a cooking chamber and a heating chamber containing heating means. Fan means in the heating chamber create a draft into which water vapor is introduced and the draft is circulated through both chambers. The product is carried on a vapor pervious conveyor through the cooking chamber.

The cooking process comprises the steps of providing a food treatment chamber equipped with a vapor pervious conveyor; preparing a moving stream of a process vapor at a temperature above 212° F.; circulating the stream along the conveyor; injecting water vapor into the moving stream of process vapor and supplying heat to the moving stream; placing the food product in discrete pieces upon the conveyor; and moving the product continuously in its original position on the conveyor through the treatment chamber.

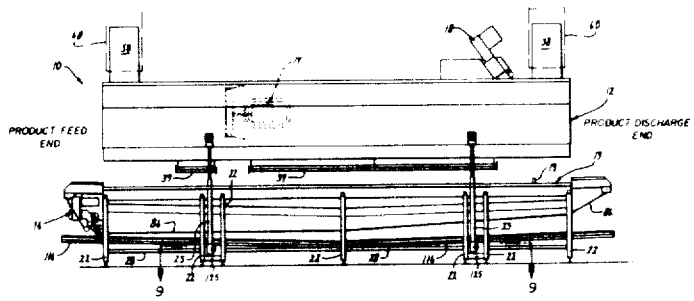

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-11 is confirmed.

* * * * *